(12) United States Patent
Otuka (10) Patent No.: US 7,793,944 B2
(45) Date of Patent: Sep. 14, 2010

(54) SEALING DEVICE (75) Inventor: Masaya Otuka, Aso (JP)

(73) Assignee: Nok Corporation, Tokyo (JP)

( * ) Notice: Subject to any disclaimer, the term of this patent is extended or adjusted under 35 U.S.C. 154(b) by 0 days.

(21) Appl. No.: 11/794,231

(22) PCT Filed: Dec. 7, 2005

(86) PCT No.: PCT/JP2005/022430

§ 371 (c)(1),
(2), (4) Date: Jun. 27, 2007

(87) PCT Pub. No.: WO2006/070568

PCT Pub. Date: Jul. 6, 2006

(65) Prior Publication Data

US 2008/0018059 A1    Jan. 24, 2008

(30) Foreign Application Priority Data

Dec. 28, 2004    (JP) ............................... 2004-379362

(51) Int. Cl.
*F16L 17/06*    (2006.01)
*F16J 15/10*    (2006.01)

(52) U.S. Cl. ............ 277/611; 277/587; 277/584; 277/641; 277/589; 277/619; 277/638

(58) Field of Classification Search ............... 277/587, 277/584, 641, 589, 452, 531, 611, 619, 638
See application file for complete search history.

(56) References Cited

U.S. PATENT DOCUMENTS

| 2,398,399 | A | * | 4/1946 | Alexander | ............ 277/619 |
|---|---|---|---|---|---|
| 2,420,104 | A | * | 5/1947 | Smith | ............ 277/453 |
| 2,462,586 | A | * | 2/1949 | Whittingham | ............ 277/452 |
| 2,616,731 | A | * | 11/1952 | Osmun | ............ 277/584 |
| 2,739,855 | A | * | 3/1956 | Bruning | ............ 277/584 |
| 2,809,080 | A | * | 10/1957 | Mittell et al. | ............ 277/458 |
| 3,118,682 | A | * | 1/1964 | Fredd | ............ 277/584 |
| 3,188,099 | A | * | 6/1965 | Johnson et al. | ............ 277/437 |
| 3,455,566 | A | * | 7/1969 | Hull et al. | ............ 277/582 |
| 3,582,093 | A | * | 6/1971 | Lucien | ............ 277/434 |

(Continued)

FOREIGN PATENT DOCUMENTS

JP    64-24766    2/1989

(Continued)

*Primary Examiner*—Alison K Pickard
(74) *Attorney, Agent, or Firm*—Jacobson Holman PLLC (57) ABSTRACT

In a sealing device (1) installed in an installation groove (4) provided in one member (2) of two members (2, 3) facing to each other so as to be brought into close contact with the other (3), the sealing device has a seal ring (11) and a backup ring (21) arranged in a low-pressure side (L) of the seal ring (11), the installation groove (4) has a slope bottom surface (4*c*), the backup ring (21) has a slope surface (21*a*). The sealing device (1) is to be made such that the seal ring (11) made of a rubber-like elastic body is prevented from being damaged by the backup ring (21) made of a hard material. In order to achieve this object, a second backup ring (31) is arranged between the seal ring (11) and the backup ring (21), and formed by a softer material than the backup ring (21).

3 Claims, 5 Drawing Sheets

U.S. PATENT DOCUMENTS

| | | | | |
|---|---|---|---|---|
| 3,614,114 A | * | 10/1971 | Traub | 277/589 |
| 3,765,690 A | * | 10/1973 | Sievenpiper | 277/556 |
| 4,328,974 A | * | 5/1982 | White et al. | 277/308 |
| 4,556,227 A | * | 12/1985 | Sato et al. | 277/619 |
| 4,883,029 A | * | 11/1989 | Winston | 123/193.6 |
| 5,118,119 A | * | 6/1992 | Ditlinger | 277/452 |
| 5,123,662 A | * | 6/1992 | Sugimura | 277/584 |
| 5,524,905 A | * | 6/1996 | Thoman et al. | 277/572 |
| 5,806,858 A | * | 9/1998 | Harrelson, III | 277/537 |
| 5,879,010 A | * | 3/1999 | Nilkanth et al. | 277/545 |
| 6,305,265 B1 | * | 10/2001 | Bingham et al. | 92/168 |

FOREIGN PATENT DOCUMENTS

| | | |
|---|---|---|
| JP | 5-3734 | 1/1993 |
| JP | 08-135795 | 5/1996 |
| JP | 11-072162 | 3/1999 |
| JP | 2001-355733 | 12/2001 |
| JP | 2002-156043 | 5/2002 |
| JP | 2002-161983 | 6/2002 |

* cited by examiner

SEALING DEVICE

This is a national stage of the International Application No. PCT/JP2005/022430 filed Dec. 7, 2005 and published in Japanese language.

BACKGROUND OF THE INVENTION

1. Field of the Invention

The present invention relates to a sealing device in accordance with a sealing technique, and more particularly to a sealing device which is suitably used in a high-pressure hydrogen piping for a fuel battery. Further, the sealing device in accordance with the present invention is also used in the other high-pressure gas piping such as a piping for a helium, a nitrogen or the like.

2. Description of the Conventional Art

Figure 6:
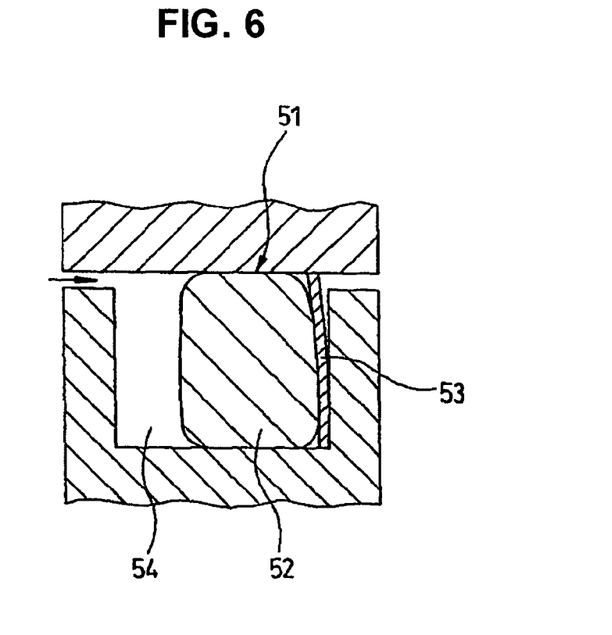
FIG. 6 is a cross sectional view of a main portion of a sealing device in accordance with the prior art.

Conventionally, a sealing device 51 shown in FIG. 6 has been known. In this sealing device 51, a seal ring 52 constituted by a rubber-like elastic body is installed to an installation groove 54, and a backup ring 53 made of a material which is hard to transmit gas is installed to a low-pressure side (refer to patent document 1).

However, in the case that the backup ring 53 is made of the material which is hard to transmit gas, there is a case that hardness of this material becomes extremely higher in comparison with the rubber-like elastic body corresponding to a material of the seal ring 52. In this case, if the sealing device 51 mentioned above is used, for example, in a position where a pressure alternation (ON and OFF) is generated under a high pressure condition, the seal ring 53 is damaged by the backup ring 54 made of the hard material, whereby there is a risk that a sealing performance is deteriorated.

Further, in the following patent document 2, there is described a sealing device in which a low-pressure side of a seal ring is provided with a second backup ring made of a soft material and a first backup ring made of a hard material, an inner-diameter taper portion is provided in a peripheral surface close to a groove bottom of the second backup ring, and a taper-shaped bottom wall portion corresponding to the inner-diameter taper portion of the second backup ring is provided in a groove bottom surface of a mounting groove, in order to improve a sealing performance and a durability. However, this sealing device is used for another intended use, and does not correspond to a seal for gas.

Patent Document 1: Japanese Unexamined Patent Publication No. 2001-355733

Patent Document 2: Japanese Unexamined Patent Publication No. 11-72162

SUMMARY OF THE INVENTION

Problem to be Solved by the Invention

The present invention is made by taking the above points into consideration, and an object of the present invention is to provide a sealing device in which a seal ring constituted by a rubber-like elastic body can be prevented from being damaged by a backup ring made of a hard material.

Means for Solving the Problem

In order to achieve the object mentioned above, in accordance with a first aspect of the present invention, there is provided a sealing device installed in an installation groove provided in one member of two members facing to each other so as to be brought into close contact with the other member, comprising:

a seal ring made of a rubber-like elastic body; and a backup ring arranged at a low-pressure side of the seal ring and formed by a harder resin material than the seal ring, the installation groove having a slope bottom surface formed so as to narrow an interval between the two members gradually from a high-pressure side to the low-pressure side at a position to which the backup ring is installed, and the backup ring having a slope surface corresponding to the slope bottom surface, wherein a second backup ring is provided between the seal ring and the backup ring, and the second backup ring is formed by a softer material than the backup ring.

Further, in accordance with a second aspect of the present invention, there is provided a sealing device as recited in the first aspect mentioned above, wherein the backup ring is formed by a material which is hard to transmit gas in comparison with the second backup ring.

Further, in accordance with a third aspect of the present invention, there is provided a sealing device as recited in the second aspect mentioned above, wherein the backup ring is formed by a nylon.

Further, in accordance with a fourth aspect of the present invention, there is provided a sealing device as recited in any one of the first to third aspects mentioned above, wherein an initial gap is set between a low-pressure side surface of the backup ring and a side surface of the installation groove facing to the low-pressure side surface.

Further, in accordance with a fifth aspect of the present invention, there is provided a sealing device as recited in any one of the first to third aspects mentioned above, wherein a slope surface of the backup ring and/or the second backup ring is formed such that an angle of slope is larger than an angle of slope of the slope bottom surface.

Further, in accordance with a sixth aspect of the present invention, there is provided a sealing device as recited in any one of the first to third aspects mentioned above, wherein an initial collapsing margin is set at a position where the backup ring or/and the second backup ring is brought into contact with the other member.

In the sealing device in accordance with the first aspect of the present invention provided with the structure mentioned above, the seal ring, the second backup ring and the backup ring are arranged in this order from the high-pressure side where a sealed fluid exists to the low-pressure side at an opposite side. The second backup ring in the middle is formed by the softer material than the backup ring at the low-pressure side. Accordingly, since the seal ring made of the rubber-like elastic body is not brought into contact with the backup ring made of the hard material, but is brought into contact with the second backup ring made of the softer material than the backup ring, it is possible to prevent the seal ring from being damaged at a time when a pressure alternation is generated. Further, since the second backup ring is made of the soft material, protrusion tends to be generated, however, the protrusion can be prevented by the first backup ring formed by the hard material.

Further, the installation groove is provided with the slope bottom surface formed so as to narrow the interval between two members gradually from the high-pressure side to the low-pressure side, at the position where the backup ring is installed, and the backup ring is provided with the slope surface corresponding to the slope bottom surface. Accordingly, if pressure of the sealed fluid is applied to the backup ring via the seal ring, the backup ring is compressed in such a manner as to be pressed into a narrower space, and is brought into strong contact with the opposite surface. Therefore, since a compression phenomenon is generated in the backup ring by the slope surface mentioned above, not only the seal ring is hard to protrude, but also it is expected to seal by the backup ring in the case that the sealed fluid can not be sealed only by the seal ring.

Further, in addition, in the sealing device in accordance with the second aspect of the present invention, since the backup ring is formed by the material which is harder to transmit gas in comparison with the second backup ring, it is possible to reduce a transmission leak caused by transmission of high-pressure gas corresponding to the sealed fluid through the backup ring. As a material which is hard to transmit gas, the nylon is particularly preferable, as described in the third aspect.

Further, in order to further increase the sealing performance by utilizing the compression phenomenon generated by the slope surface mentioned above, it is effective to use the following means:

The initial gap is set between the low-pressure side surface of the backup ring and the side surface of the installation groove facing to the low-pressure side surface, as described in the fourth aspect. In accordance with this means, since the backup ring is going to be displaced in a direction of eliminating the initial gap at a time when the backup ring is pushed by pressure, an amount of compression of the backup ring is increased at this degree at a time when the pressure is applied. Accordingly, since inner and outer peripheral surfaces of the backup ring are strongly brought into pressure contact with the opposite surfaces, it is possible to reduce the gap leak.

Further, the slope surface of the backup ring or/and the second backup ring is formed such that the angle of slope is larger than the angle of slope of the slope bottom surface, as described in the fifth aspect. As a result, the gap having a shape enlarged gradually from the high-pressure side to the low-pressure side is formed between the slope surface and the slope bottom surface. In accordance with this means, since the collapsing margin against the slope bottom surface is generated at the position of the leading end of the slope surface at a time when the backup ring is pushed by pressure, it is possible to increase the amount of compression of the backup ring or/and the second backup ring at a time when the pressure is applied. Accordingly, since the inner and outer peripheral surfaces of the backup ring are strongly brought into pressure contact with the opposite surfaces, it is possible to reduce the gap leak.

Further, the initial collapsing margin is set at the position where the backup ring or/and the second backup ring is brought into contact with the other member, as described in the sixth aspect. In accordance with this means, since the backup ring or/and the second backup ring is set to the compressed state before pressure is applied thereto, and the compression generated at a time when pressure is applied is added, the amount of compression of the backup ring or/and the second backup ring is increased at a time when the pressure is applied. Accordingly, since the inner and outer peripheral surfaces of the backup ring are strongly brought into pressure contact with the opposite surfaces, it is possible to reduce the gap leak.

EFFECT OF THE INVENTION

The present invention achieves the following effects.

In the sealing device in accordance with the first aspect of the present invention, since the second backup ring is provided between the seal ring and the backup ring and the second backup ring is formed by the softer material than the backup ring, the seal ring constituted by the rubber-like elastic body is not brought into contact with the backup ring made of the hard material, but is brought into contact with the second backup ring formed by the softer material than the backup ring. Accordingly, since the opposite side to contact is made of the softer material than the conventional one, it is possible to effectively prevent the seal ring from being repeatedly pressed against the hard material so as to be damaged at a time when the pressure alternation is generated or the like. Further, since the second backup ring is made of the soft material, protrusion tends to be generated. However, it is possible to suppress the protrusion by the first backup ring formed by the hard material.

Further, in addition to this, in the sealing device in accordance with the second aspect of the present invention, since the backup ring is formed by the material which is harder to transmit gas in comparison with the second backup ring, it is possible to reduce a transmission leak generated by transmission of high-pressure gas corresponding to the sealed fluid through the backup ring.

Further, in the sealing device in accordance with the third aspect of the present invention, since the backup ring is formed by the nylon, it is possible to effectively seal high-pressure gas corresponding to the sealed fluid, on the basis of gas impermeability which the backup ring made of the nylon has.

Further, in accordance with the structure of each of the fourth to sixth aspects of the present invention, since an amount of compression of the backup ring or/and the second backup ring is increased, a gap leak is reduced by a compression phenomenon of the backup ring or/and the second backup ring, and it is possible to further improve the sealing performance.

BRIEF EXPLANATION OF DRAWINGS

FIGS. 2A and 2B are views showing a sealing device in accordance with a second embodiment of the present invention, in which

FIGS. 3A and 3B are views showing a sealing device in accordance with a third embodiment of the present invention, in which

FIGS. 4A and 4B are views showing a sealing device in accordance with another embodiment of the present invention, in which

DESCRIPTION OF REFERENCE NUMERALS

1 sealing device
2 one member
3 the other member
4 installation groove 4a high-pressure side installation position
4b low-pressure side installation position
4c slope bottom surface
4d side surface
11 seal ring
21 first backup ring (backup ring)
21a, 31a slope surface
21b low-pressure side surface
21c, 31c outer peripheral surface
31 second backup ring

DETAILED DESCRIPTION OF PREFERRED EMBODIMENT

The following modes for carrying out the invention are included in the present invention.

(1-1) A sealing device sealing between two members and constituted by a rubber ring-shaped seal ring attached to an annular groove provided in any one of them, and two backup rings incorporated at a low pressure side of the seal ring, wherein the backup rings are formed in a tapered shape in such a manner that a depth (a height) of the backup ring is reduced gradually with respect to a direction in which a pressure is applied.

(1-2) A sealing device sealing between two members and constituted by a rubber ring-shaped seal ring attached to an annular groove provided in any one of them, and two backup rings incorporated at a low pressure side of the seal ring, wherein the backup ring at the low pressure side is formed in a tapered shape in such a manner that a depth (a height) of the backup ring is reduced gradually with respect to a direction in which a pressure is applied, and an angle of the taper is formed in a shape processed in such a manner that an angle of the backup ring becomes larger in comparison with a taper angle of a groove. It is desirable that the other backup ring is set larger in comparison with the angle of the groove similarly.

(1-3) A sealing device sealing between two members and constituted by a rubber ring-shaped seal ring attached to an annular groove provided in any one of them, and two backup rings incorporated at a low pressure side of the seal ring, wherein a thickness (a height) at the low pressure side in the backup ring at the low pressure side has a thickness which is equal to or slightly larger than a height of a side surface in a low pressure side of a groove.

(1-4) A sealing device sealing between two members and constituted by a rubber ring-shaped seal ring attached to an annular groove provided in any one of them, and two backup rings incorporated at a low pressure side of the seal ring, wherein a gap is generated between a side surface of the backup ring having a lowest pressure and a groove wall at the low pressure side.

(2-1) A sealing device sealing between two members and constituted by a rubber ring-shaped seal ring attached to an annular groove provided in any one of them, and two backup rings incorporated at a low pressure side of the seal ring, wherein the backup rings are formed in a tapered shape in such a manner that a depth (a height) of the backup ring is reduced gradually with respect to a direction in which a pressure is applied.

(2-2) A sealing device sealing between two members and constituted by a rubber ring-shaped seal ring attached to an annular groove provided in any one of them, and two backup rings incorporated at a low pressure side of the seal ring, wherein the backup ring at the low pressure side is formed in a tapered shape in such a manner that a depth (a height) of the backup ring is reduced gradually with respect to a direction in which a pressure is applied, and an angle of the taper is formed in a shape processed in such a manner that an angle of the backup ring becomes larger in comparison with a taper angle of a groove. It is desirable that the other backup ring is set larger in comparison with the angle of the groove similarly.

(2-3) A sealing device sealing between two members and constituted by a rubber ring-shaped seal ring attached to an annular groove provided in any one of them, and two backup rings incorporated at a low pressure side of the seal ring, wherein a thickness (a height) at the low pressure side in the backup ring at the low pressure side has a thickness which is equal to or slightly larger than a height of a side surface in a low pressure side of a groove. Further, an outer diameter of these two backup rings before being incorporated is set slightly larger than an inner diameter of a housing.

(2-4) A sealing device sealing between two members and constituted by a rubber ring-shaped seal ring attached to an annular groove provided in any one of them, and two backup rings incorporated at a low pressure side of the seal ring, wherein a gap is generated between a side surface of the backup ring having a lowest pressure and a groove wall at the low pressure side.

EMBODIMENTS

Next, a description will be given of embodiments in accordance with the present invention with reference to the accompanying drawings.

First Embodiment

Figure 1:
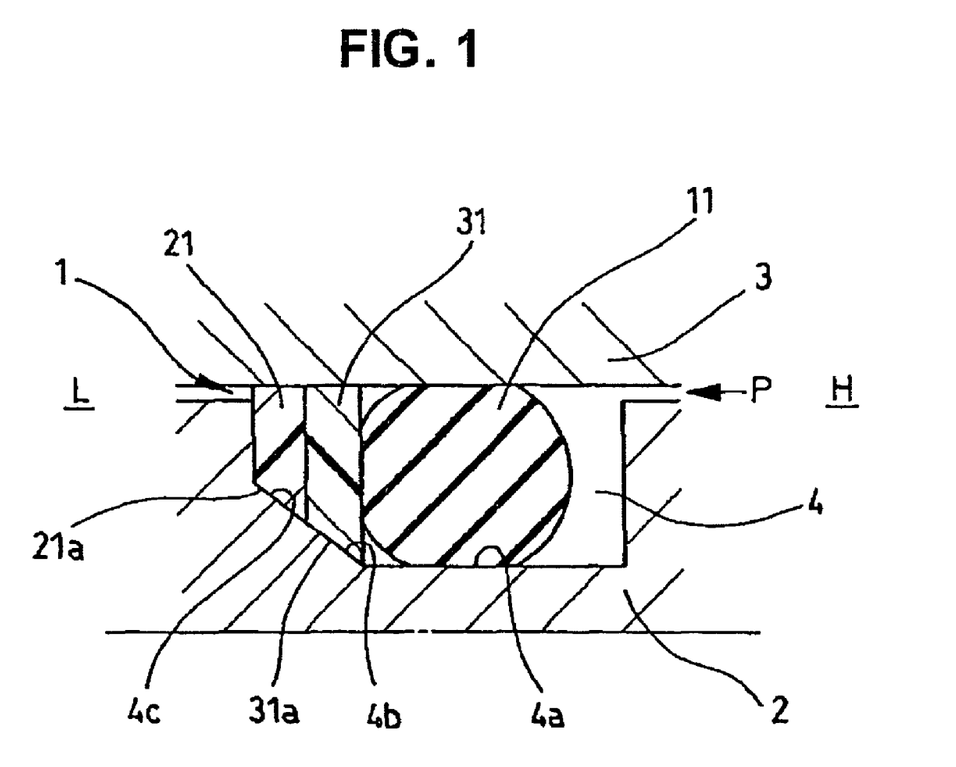
FIG. 1 is a cross sectional view of a main portion of a sealing device in accordance with a first embodiment of the present invention.

FIG. 1 shows a cross section of a main portion of a sealing device 1 in accordance with a first embodiment of the present invention.

The sealing device 1 in accordance with the embodiment is installed to an installation groove (an installation portion) 4 provided in one member 2 of two members 2 and 3 facing to each other so as to be brought into close contact with the other member 3, thereby sealing between two members 2 and 3. The sealing device 1 has a seal ring (a rubber ring-shaped packing) 11 constituted by a rubber-like elastic body, a first backup ring (a backup ring) 21 arranged at a low pressure side L of the seal ring 11, and a second backup ring 31 arranged between the seal ring 11 and the first backup ring 21. The two members 2 and 3 mentioned above are constituted, for example, by high-pressure hydrogen pipings for a fuel battery coupled to each other. At an outer peripheral side of a seal housing portion in one piping member 2, there is arranged a seal housing portion of the other piping member 3. The sealing device 1 is installed to an annular installation groove 4 provided in the outer peripheral surface of the seal housing portion of the one piping member 2, and is brought into close contact with an inner peripheral surface of the seal housing portion of the other piping member 3. A sealed fluid is high-pressure hydrogen gas which is going to flow to a low pressure side L from a high pressure side H.

A backup ring made of a nylon (trade name) is used as the first backup ring 21. The nylon is one of resin materials which are hard to transmit a gas. Further, as the second backup ring 31, there is employed a backup ring made of a softer material in comparison with the first backup ring 21, for example, a PTFE resin. Both of the backup rings 21 and 31 employ a ring with ends which is cut at one position on a circumference for facilitating an incorporation in most cases. However, in the case of taking a gas leak into consideration, it is preferable to employ an endless type backup ring with no cut.

On the other hand, the seal ring 11 can employ any material as far as the material has a rubber-like nature (an elasticity and the like) under a use condition, however, there are employed, for example, a vulcanized rubber such as an FKM rubber, an NBR rubber, an H-NBR rubber, a butyl rubber, an EPM rubber, an EPDM rubber and the like, a thermoplastic rubber and the like.

The installation groove 4 is basically formed as a space having a rectangular cross section, however, a high-pressure side installation position 4a for installing the seal ring 11 is formed as a flat surface shape having a cylindrical surface, in a groove bottom portion thereof. Further, a low-pressure side installation position 4b for installing first and second backup rings 21 and 31 connected to the low pressure side L of the high-pressure side installation position 4a is formed in an inclined surface shape having a conical surface in such a manner as to narrow an interval (an interval in a diametrical direction) between the two members 2 and 3 gradually from the high pressure side H to the low pressure side L, that is, in such a manner as to reduce a groove depth of the installation portion 4 gradually, and is formed as a slope bottom surface 4c.

Further, each of the first and second backup rings 21 and 31 installed to the low-pressure side installation position 4b is basically formed in a rectangular cross sectional shape, however, an inner peripheral surface thereof is formed in a slope surface shape having a conical surface in such a manner as to enlarge an inner diameter gradually from the high pressure side H to the low pressure side L in correspondence to the slope bottom surface 4c, and is formed as slope surfaces 21a and 31a.

In the sealing device 1 having the structure mentioned above, if a pressure P is applied from a right side in FIG. 1, the seal ring 11 is pressed to the second backup ring 31 at the low pressure side, however, the second backup ring 31 is formed by the PTFE resin which is softer than the first backup ring 21 made of the nylon. Accordingly, it is possible to prevent the seal ring 11 from repeatedly pressed to the hard material so as to be damaged at a time when a pressure alternation is generated or the like. Further, since the second backup ring 31 is formed by the PTFE resin corresponding to the soft material, a protrusion tends to be generated, however, the protrusion is prevented by the first backup ring 21 formed by the nylon corresponding to the hard material.

Further, the installation groove 4 is provided with the slope bottom surface 4c narrowing the interval between two members 2 and 3 gradually from the high pressure side H to the low pressure side L, and both the backup rings 21 and 31 are respectively provided with the slope surfaces 21a and 31a corresponding to the slope bottom surface 4c in the inner peripheral surfaces. Accordingly, if a sealed fluid pressure is applied to both the backup rings 21 and 31 via the seal ring 11, both the backup rings 21 and 31 are compressed in such a manner as to be pressed to the narrow portions so as to be strongly brought into close contact with opposite surfaces. Therefore, since a compression phenomenon caused by the slope surfaces 21a and 31a is generated in both the backup rings 21 and 31, the seal ring 11 is further hard to protrude. Further, in the case that it is impossible to seal the high-pressure hydrogen corresponding to the sealed fluid only by the seal ring 11, it is possible to expect that the high-pressure hydrogen can be sealed by the backup rings 21 and 31.

Further, the backup ring 21 is formed by the nylon which is hard to transmit the gas. Accordingly, it is possible to expect an effective reduction of the leak caused by the transmission of the high-pressure hydrogen gas corresponding to the sealed fluid through the backup ring 21 from this respect.

Further, a width in a diametrical direction of the backup ring 21 is set smaller than a width in a diametrical direction of the second backup ring 31. Accordingly, "transmission area" in the following gas transmission expression is set smaller. Therefore, it is possible to effectively seal the high-pressure hydrogen gas corresponding to the sealed fluid, form this respect.

(Gas Transmission Expression)

Gas transmission leak amount (g)=molecular weight of gas (g/mol)/22410 (cm$^3$(STP)/mol)×transmission coefficient ($Pp_2T$=const)×transmission time (sec)×transmission area (cm$^2$)×gas pressure (Pa)/transmission distance (cm)

Second Embodiment

Figure 2A:
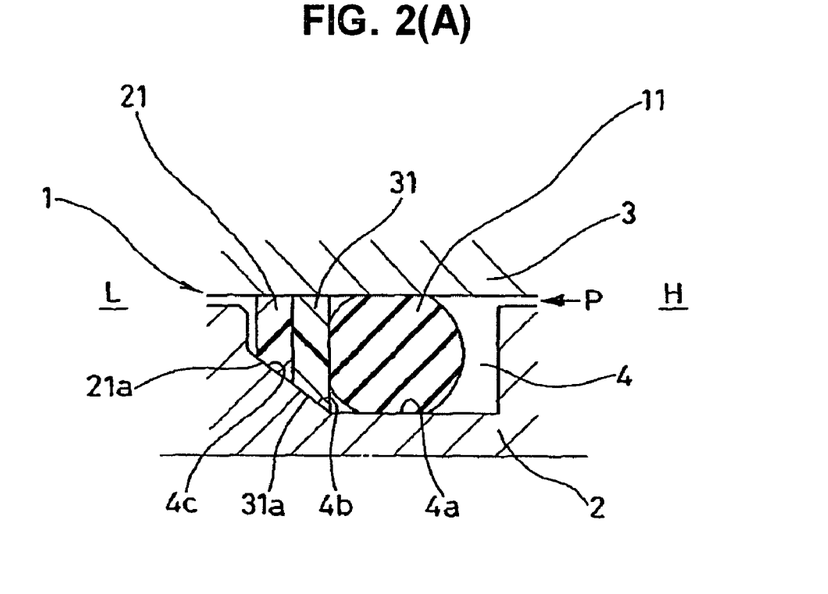
FIG. 2A is a cross sectional view of a main portion.
Figure 2B:
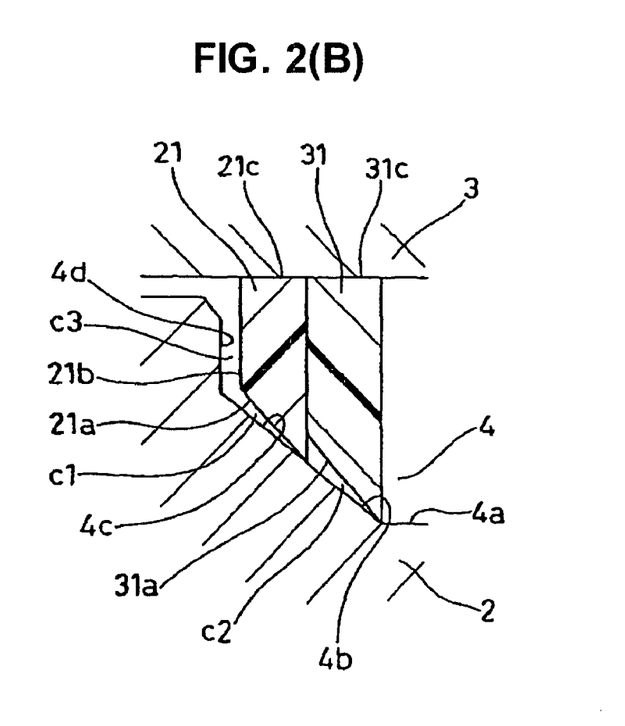
FIG. 2B is an enlarged view of the main portion of FIG. 2A.

FIG. 2 shows a sealing device 1 in accordance with a second embodiment of the present invention. In other words, FIG. 2A is a cross-sectional view of a main portion of the sealing device 1, and FIG. 2B is an enlarged view of a main portion of FIG. 2A.

The sealing device 1 in accordance with the embodiment is installed to an installation groove (an installation portion) 4 provided in one member 2 of two members 2 and 3 facing to each other so as to be brought into close contact with the other member 3, thereby sealing between two members 2 and 3. The sealing device 1 has a seal ring (a rubber ring-shaped packing) 11 constituted by a rubber-like elastic body, a first backup ring (a backup ring) 21 made of a material which is hard to transmit a gas and arranged in a low pressure side L of the seal ring 11, and a second backup ring 31 arranged between the seal ring 11 and the first backup ring 21. The two members 2 and 3 mentioned above are constituted, for example, by high-pressure hydrogen pipings for a fuel battery coupled to each other. At an outer peripheral side of a seal housing portion in one piping member 2, there is arranged a seal housing portion of the other piping member 3. The sealing device 1 is installed to an annular installation groove 4 provided in the outer peripheral surface of the seal housing portion of the one piping member 2, and is brought into close contact with an inner peripheral surface of the seal housing portion of the other piping member 3. A sealed fluid is high-pressure hydrogen gas which is going to flow to a low pressure side L from a high pressure side H.

As the backup ring 21, for example, there can be employed a backup ring made of a hard resin material such as a nylon (trade name), a polyphenylene sulfide resin (PPS), a polyacetal resin (POM), a polyamide resin (PA), a polyether ether ketone resin (PEEK), a polyacrylonitrile resin, a polyvinyl alcohol resin, an HDPE resin, a PS resin or the like, or a gunmetal (a bronze), however, the nylon is particularly preferable as the material which is hard to transmit gas. Further, as the second backup ring 31, there is employed a backup ring made of a softer material in comparison with the first backup ring 21, for example, a PTFE resin. Both of the backup rings 21 and 31 employ a ring with ends which is cut at one position on a circumference for facilitating an incorporation in most cases. However, in the case of taking a gas leak into consideration, it is preferable to employ an endless type backup ring with no cut.

On the other hand, the seal ring 11 can employ any material as far as the material has a rubber-like nature (an elasticity and the like) under a use condition, however, there are employed, for example, a vulcanized rubber such as an FKM rubber, an NBR rubber, an H-NBR rubber, a butyl rubber, an EPM rubber, an EPDM rubber and the like, a thermoplastic rubber and the like.

The installation groove 4 is basically formed as a space having a rectangular cross section, however, a high-pressure side installation position 4a for installing the seal ring 11 is formed as a cylindrical flat surface shape, in a groove bottom portion thereof. Further, a low-pressure side installation position 4b for installing first and second backup rings 21 and 31 connected to the low pressure side L of the high-pressure side installation position 4a is formed in a conical inclined surface shape in such a manner as to narrow an interval (an interval in a diametrical direction) between the two members 2 and 3 gradually from the high pressure side H to the low pressure side L, that is, in such a manner as to reduce a groove depth of the installation portion 4 gradually, and is formed as a slope bottom surface 4c.

Further, each of the first and second backup rings 21 and 31 installed to the low-pressure side installation position 4b is basically formed in a rectangular cross sectional shape, however, an inner peripheral surface thereof is formed in a conical slope surface shape in such a manner as to enlarge an inner diameter gradually from the high pressure side H to the low pressure side L in correspondence to the slope bottom surface 4c, and is formed as slope surfaces 21a and 31a. Further, as shown in FIG. 2B in an enlarged manner, an angle of slope of each of the slope surfaces 21a and 31a is formed larger than an angle of slope of the slope bottom surface 4c, and gaps (diametrical gaps) c1 and c2 expanding gradually from the high pressure side H to the low pressure side L are set between the respective slope surfaces 21a and 31a and the slope bottom surface 4c.

Further, an initial gap (an axial gap) c3 is set between a side surface 21b at a low pressure side of the first backup ring 21 arranged at the lowest pressure side L and a side surface 4d at a low pressure side of the installation groove 4 facing thereto, and a thickness (a height) at the low pressure side of the first backup ring 21 is formed equal to or slightly longer than the height of the side surface 4d at the low pressure side of the installation groove 4.

Further, each of outer peripheral surfaces 21c and 31c of the first and second backup rings 21 and 31 is formed in a cylindrical flat surface shape, and an outer diameter thereof is set in such a manner that an initial collapsing margin is not provided with respect to an inner peripheral surface of the seal housing portion in the other piping member 3.

In the sealing device 1 having the structure mentioned above, a description will be given of a behavior of the backup rings 21 and 31 and the seal ring 11 at a time when a pressure P is applied from a right side in FIG. 1.

If the pressure P is applied to the seal ring 11, the seal ring 11 presses the second backup ring 31 positioned in adjacent to the seal ring 11 to the low pressure side L. The first backup ring 21 is pressed to the low pressure side L by the second backup ring 31 in the same manner, however, since the slope surfaces 21a and 31a are provided in the inner diameter portions of both the backup rings 21 and 31 in correspondence to the slope bottom surface 4c of the installation portion 4, both the backup rings 21 and 31 are exposed to a component force in an outer peripheral direction together with the pressure to the low pressure side L, and exhibits such a behavior as to protrude to the outer diameter side. At this time, since the initial gap c3 is set at the low pressure side L of the first backup ring 21 with respect to the side surface 4d of the installation portion 4, the pressure is applied in a direction of filling up the gap c3. Further, since the high pressure side H of the backup rings 21 and 31 is set so as to have a slight collapsing margin, the minimum inner diameter portions of the slope surfaces 21a and 31a move to the low pressure side L in a state of being brought into contact with the opposite surface. Accordingly, both the backup rings 21 and 31 exhibit such operations as to eliminate the gaps c1 and c2 on the basis of an application of the pressure.

On the other hand, since the seal ring 11 is previously provided with the collapsing margin at the inner and outer diameter sides, the high-pressure gas is sealed by a repulsion force. However, since there is gas leaking after transmitting through the rubber material, an entire leak amount is reduced by the following operation with respect to the gas transmitting through the rubber material.

When the gas transmits through the rubber material, both the backup rings 21 and 31 are moved to the low pressure side L while slightly collapsing the inner diameter portions thereof. Accordingly, since a slight surface pressure is generated in the inner and outer diameter portions, the gas transmitting through the seal ring 11 is sealed to some extent at the high pressure side of the second backup ring 31. Although a gas transmitting amount is not more than that in the rubber-like elastic body, the gas reaches the first backup ring 21 after transmitting through the second backup ring 31. However, since there can be considered that the pressure of the gas has been already reduced at a time of passing through the seal ring 11 and the second backup ring 21, the seal condition in the first backup ring 21 is easier than the seal condition in the second backup ring 31, and it is possible to seal to some extent. Further, since the first backup ring 21 is made of the material which is hard to transmit the gas, an amount of the gas transmitting through the material is extremely small. Accordingly, it is possible to make the leak amount minimum as the entire of the sealing device 1.

Further, if the pressure alternation is generated under the high-pressure condition, there is a case that the seal ring 11 is damaged by the first backup ring 21 made of the hard material as mentioned above. However, since the soft material is used for the second backup ring 31 brought into contact with the seal ring 11, it is possible to prevent the seal ring 11 from being damaged. Further, since the second backup ring 31 tends to be deformed with respect to the pressure, it is possible to prevent the breakage caused by the protrusion of the seal ring 11, by filling up the gap c2 between the slope surface 31a and the slope bottom surface 4c.

Third Embodiment

Figure 3A:
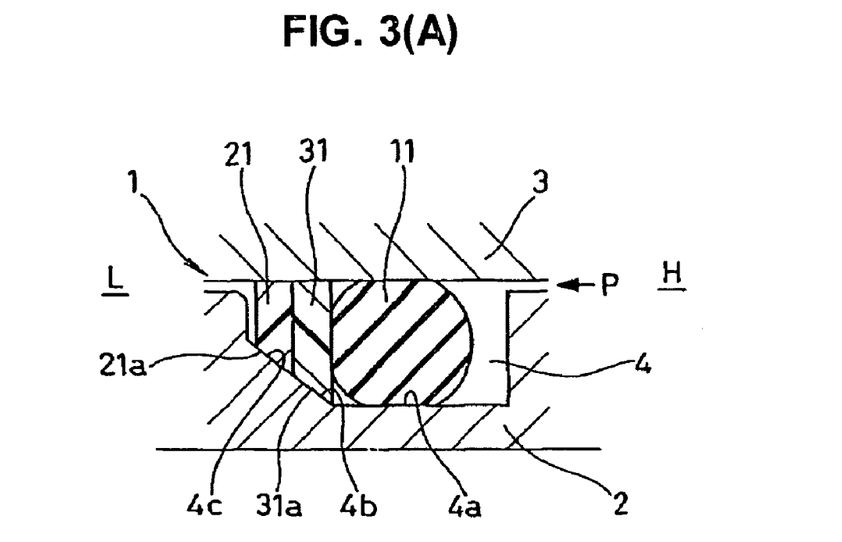
FIG. 3A is a cross sectional view of a main portion.
Figure 3B:
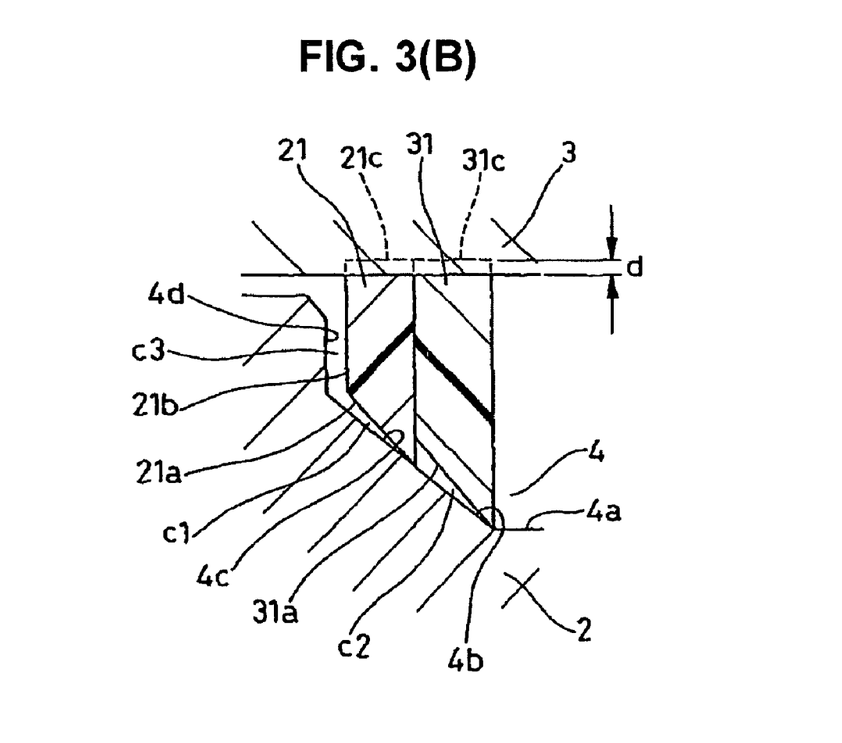
FIG. 3B is an enlarged view of the main portion of FIG. 3A.

In this case, in the second embodiment mentioned above, each of the outer peripheral surfaces 21c and 31c of the first and second backup rings 21 and 31 is set in such a manner that the initial collapsing margin is not provided with respect to the inner peripheral surface of the seal housing portion in the other piping member 3, however, may be set such that an initial collapsing margin d is provided by enlarging the outer diameters of the backup rings 21 and 31, as shown in FIG. 3. In this case, since a diametrical compressing amount of each of the backup rings 21 and 31 is increased, a surface pressure becomes higher. Accordingly, it is possible to further reduce the leaking amount of the gas passing through the inner and outer peripheries of each of the backup rings 21 and 31.

Other Embodiments

Figure 4A:
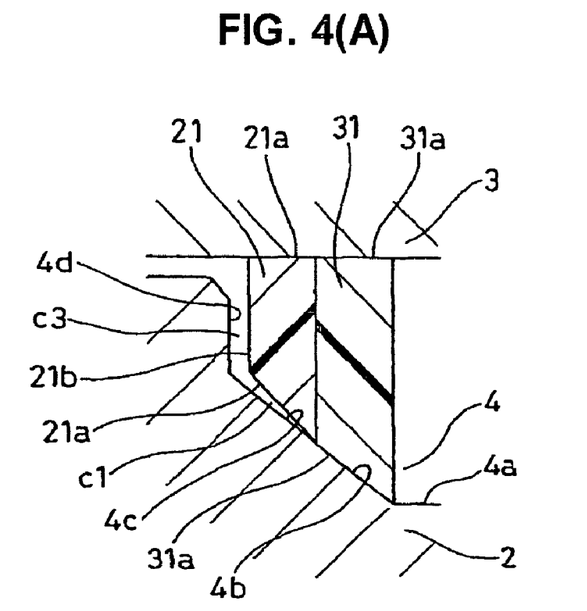
FIG. 4A is a cross sectional view of a main portion.
Figure 4B:
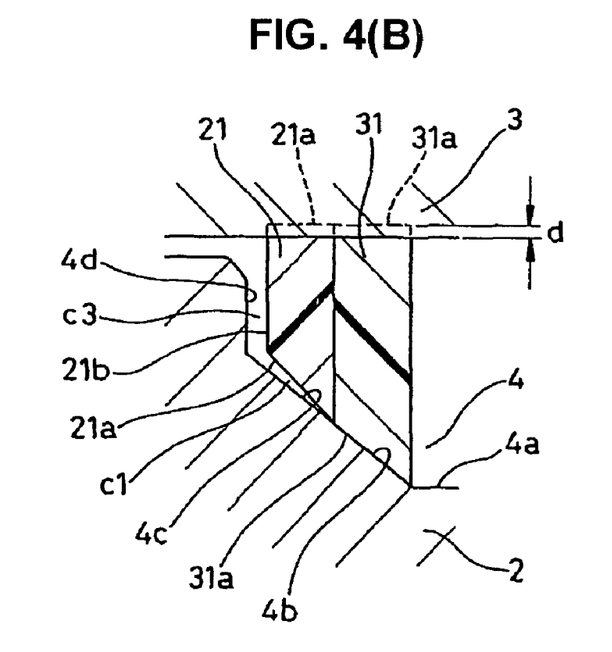
FIG. 4B is an enlarged view of portion of FIG. 4A.

Further, in common with both the embodiments mentioned above, the angle of slope of the slope surface 31a of the second backup ring 31 may be set to be equal to the angle of slope of the slope bottom surface 4c with no problem, as shown in FIG. 4, in the case that the applied pressure is large under the use environment.

Figure 5:
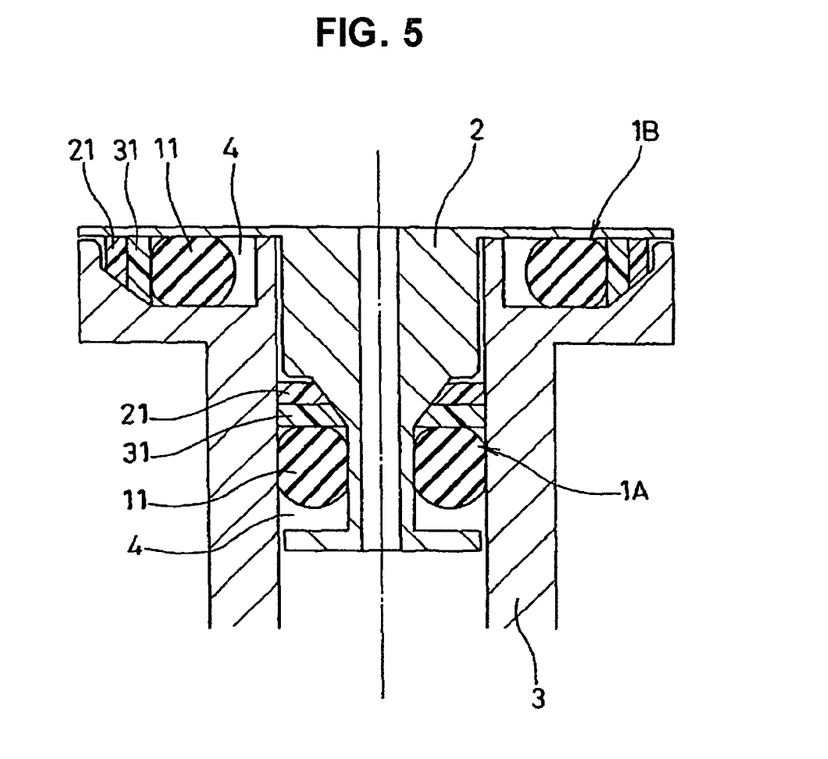
FIG. 5 is a cross sectional view of a sealing device in accordance with another embodiment of the present invention.

Further, the sealing device 1 in accordance with the present invention can be used not only for the cylindrical gap between two members, but also for a planar gap, that is, a gap between end surfaces. FIG. 5 shows a use example thereof.

In particular, a sealing device 1A in a lower portion of the drawing is structured such that the first to second backup rings 11, 21 and 31 are arranged in an axial direction in such a manner as to seal a cylindrical gap between one piping member 2 and the other piping member 3, however, a sealing device 1B in an upper portion of the drawing is structured such that the first to second backup rings 11, 21 and 31 are arranged in a diametrical direction in such a manner as to seal a planar gap between one piping member 2 and the other piping member 3. It is possible to further reduce the leakage to the external by employing a double arrangement as mentioned above.

What is claimed is:

1. A sealing device for an installation groove of a high-pressure hydrogen piping for a fuel battery, said installation groove being provided in one member of two members facing to each other so that the one member is brought into close contact with the other member, said sealing device comprising a seal ring made of a rubber-like elastic body for interposition between said two members of the high-pressure hydrogen piping, a first backup ring arranged on a low-pressure side of said seal ring and formed by a harder resin material than said seal ring, said installation groove having a sloped bottom surface formed so as to narrow an interval between said two members of the high-pressure hydrogen piping gradually from a high-pressure side to the low-pressure side at a position to which said first backup ring is installed, said first backup ring having a bottom sloped surface, a second backup ring provided between said seal ring and the first backup ring, and said second backup ring being formed by a softer material than said first backup ring, said second backup ring having a bottom sloped surface, the bottom sloped surface of only the first backup ring having an angle of slope larger than an angle of slope of the sloped bottom surface of the installation groove, an initial collapsing margin being set at a position where at least one of the first backup ring and the second backup ring is brought into contact with the other member, and an initial gap being set between a low-pressure side surface of the first backup ring and a side surface of the installation groove facing towards said low-pressure side surface of the first backup ring.

2. The sealing device as claimed in claim 1, wherein the first backup ring is formed by a material which is hard to transmit gas in comparison with the second backup ring.

3. The sealing device as claimed in claim 2, wherein the first backup ring is formed by a nylon.

* * * * *